(12) United States Patent
Wong et al.

(10) Patent No.: US 11,663,166 B2
(45) Date of Patent: May 30, 2023

(54) POST-PROCESSING GLOBAL DEDUPLICATION ALGORITHM FOR SCALED-OUT DEDUPLICATION FILE SYSTEM

(71) Applicant: EMC IP Holding Company LLC, Hopkinton, MA (US)

(72) Inventors: Tony Wong, Milpitas, CA (US); Abhinav Duggal, Jersey City, NJ (US); Smriti Thakkar, San Jose, CA (US); Yu Qiu, Hopkinton, MA (US); Pei Jie Sim, Hopkinton, MA (US); Rahul Nihalani, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/023,997

(22) Filed: Sep. 17, 2020

(65) Prior Publication Data

US 2022/0083513 A1    Mar. 17, 2022

(51) Int. Cl.
| | |
|---|---|
| G06F 16/174 | (2019.01) |
| G06F 16/182 | (2019.01) |
| G06F 17/18 | (2006.01) |
| G06F 16/11 | (2019.01) |
| G06F 16/16 | (2019.01) |

(52) U.S. Cl.
CPC ........ *G06F 16/1748* (2019.01); *G06F 16/119* (2019.01); *G06F 16/164* (2019.01); *G06F 16/1824* (2019.01); *G06F 17/18* (2013.01)

(58) Field of Classification Search
CPC .. G06F 16/1748; G06F 16/164; G06F 16/119; G06F 16/1824; G06F 17/18
See application file for complete search history.

(56) References Cited

U.S. PATENT DOCUMENTS

| | | | | |
|---|---|---|---|---|
| 10,303,797 | B1* | 5/2019 | Menezes | G06F 16/137 |
| 2014/0337363 | A1* | 11/2014 | Patterson | G06F 16/24556 |
| | | | | 707/755 |
| 2016/0004764 | A1* | 1/2016 | Chakerian | G06F 16/285 |
| | | | | 707/737 |
| 2016/0180479 | A1* | 6/2016 | Khanzode | G06F 16/355 |
| | | | | 705/311 |
| 2018/0113643 | A1* | 4/2018 | Hirsch | G06F 3/0689 |
| 2018/0218001 | A1* | 8/2018 | Lee | G06F 16/13 |

* cited by examiner

*Primary Examiner* — Hosain T Alam
*Assistant Examiner* — Anthony G Gemignani
(74) *Attorney, Agent, or Firm* — Womble Bond Dickinson (US) LLP (57) ABSTRACT

A method, apparatus, and system for redistributing files in a multi-node storage system to improve global deduplication storage savings is disclosed. A plurality of file cluster candidates are generated for a plurality of files stored at a multi-node storage system comprising a plurality of data nodes. A similarity index is determined for each of the plurality of file cluster candidates based on similarity of the files comprised in the file cluster candidate. A ranked recipe list comprising a plurality of recipes is generated. Each recipe is associated with one of the plurality of file cluster candidates, comprises a destination data node for the associated file cluster candidate, and is associated with a deduplication space savings. At least some of the plurality of files are moved between the plurality of data nodes based on the recipes in the ranked recipe list to improve deduplication space savings in the multi-node storage system.

20 Claims, 8 Drawing Sheets

POST-PROCESSING GLOBAL DEDUPLICATION ALGORITHM FOR SCALED-OUT DEDUPLICATION FILE SYSTEM

FIELD OF THE INVENTION

Embodiments of the present invention relate generally to data storage systems. More particularly, embodiments of the invention relate to global deduplication in a multi-node storage system.

BACKGROUND

Data Domain File System (DDFS), available from Dell EMC, is a file system usable with data storage systems. In the conventional DDFS virtual scaled out (VSO) architecture, deduplication occurs only within a single data node. Thus, similar files placed on two different nodes are not deduplicated. This can be a serious regression in terms of storage efficiency compared to the single node DDFS architecture.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A method, apparatus, and system for redistributing files in a multi-node storage system to improve global deduplication storage savings is disclosed. A plurality of file cluster candidates are generated for a plurality of files stored at a multi-node storage system comprising a plurality of data nodes. Each of the plurality of file cluster candidates comprises some of the plurality of files. A similarity index is determined for each of the plurality of file cluster candidates based on similarity of the files comprised in the file cluster candidate. A ranked recipe list comprising a plurality of recipes is generated. Each recipe is associated with one of the plurality of file cluster candidates, comprises a destination data node for the associated file cluster candidate, and is associated with a deduplication space savings determined based on a total file size and the similarity index of the associated file cluster candidate. The plurality of recipes in the ranked recipe list are sorted based on data movement cost-adjusted deduplication space savings. At least some of the plurality of files are moved between the plurality of data nodes based on the recipes in the ranked recipe list to improve deduplication space savings in the multi-node storage system. File movements based on highest ranked recipes in the ranked recipe list are performed first.

In one embodiment, similarity can be defined for a file, or a group of files. In case it is just a file, the segment fingerprints of that file are utilized. In case it is a group of files, the union of the fingerprints of all the file in the group is utilized. The unit of "movement" is a tag, i.e., a group of files with the same 64-bit ID. Therefore, similarity is applied to a tag of files. The process is to identify groups of tags that are similar and to place them on the same node to get optimal deduplication.

In one embodiment, each of the plurality of files is associated with a tag. The tag may be indicative of a source of the file. In one embodiment, each file cluster candidate comprises all files associated with one or more of the tags. In one embodiment, the similarity index comprises a Jaccard index.

In one embodiment, determining the data movement cost-adjusted deduplication space savings associated with a recipe comprises dividing the deduplication space savings associated with the recipe by a quantity of files that need to be moved.

In one embodiment, determining the data movement cost-adjusted deduplication space savings associated with a recipe comprises dividing the deduplication space savings associated with the recipe by an amount of data that need to be moved.

In one embodiment, a first recipe in the ranked recipe list is ignored, invalidated, or removed when a second recipe ranked higher than the first recipe is incompatible with the first recipe. Two recipes are incompatible with each other when the two file cluster candidates associated with the two recipes comprise at least one same file.

In one embodiment, each of the plurality of data nodes is associated with a storage size limit. A third recipe in the ranked recipe list is ignored, invalidated, or removed when moving all files in the file cluster candidate associated with the third recipe to the destination node of the third recipe would cause a violation of the storage size limit of the destination node.

In one embodiment, the generating of the plurality of file cluster candidates, the determining of the similarity indexes, and the generating of the ranked recipe list are performed within a self-contained environment separate from an operating system of the multi-mode storage system. In one embodiment, the ranked recipe list is stored at a shared database. The operating system of the multi-node storage system polls the shared database to read the ranked recipe list prior to the moving of at least some of the plurality of files.

In one embodiment, one or more of the plurality of file cluster candidates whose similarity indexes are below a threshold are discarded, and are not included in the ranked recipe list.

Figure 1:
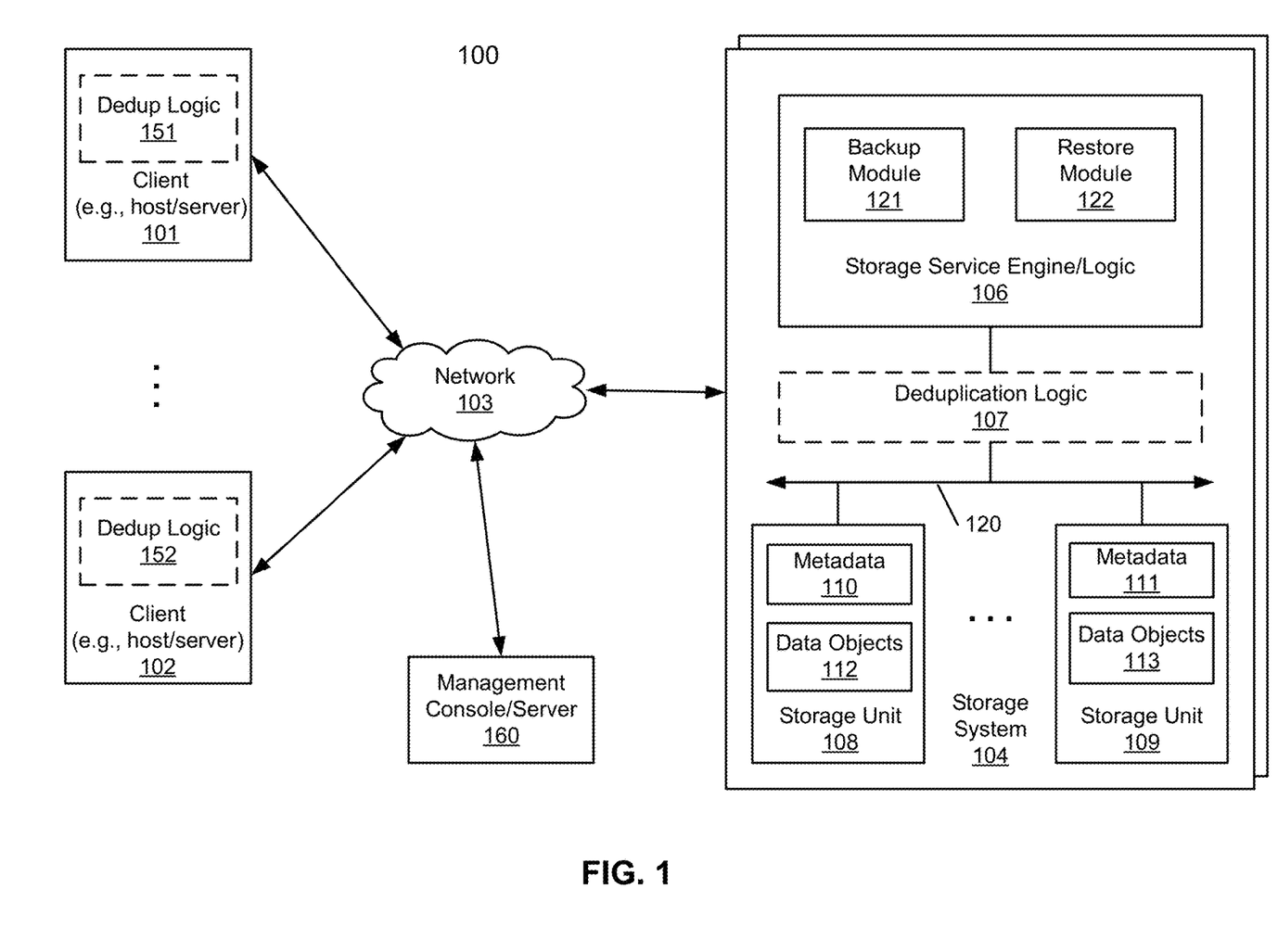
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

Figure 2:
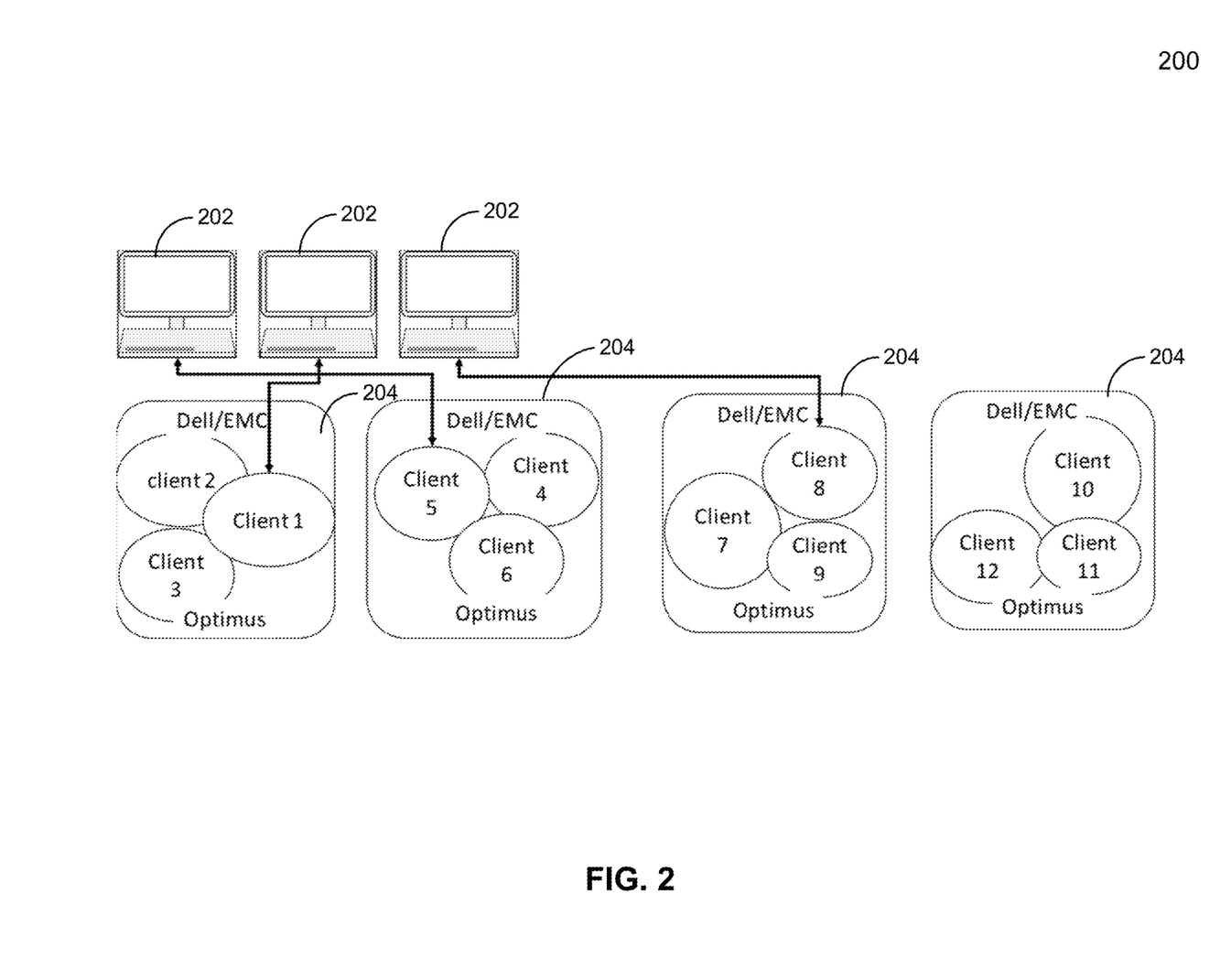
FIG. 2 is a diagram illustrating an example environment 200 in which embodiments may be practiced

Referring to FIG. 2, a diagram illustrating an example environment 200 in which embodiments may be practiced is shown. Files from one or more clients 202 may be backed up to a multi-node storage system comprising a plurality of data nodes (e.g., Dell/EMC Optimus nodes) 204.

Backup software can use a specialized protocol to assign a 64-bit tag identifier (ID) (or simply a "tag") (which can be assumed to be unique) to user files. Tags may be indicative of the origin of the files. For example, files from the same backup client may be assigned same tags. In a naïve approach, the DDFS may place files with same tags on the same node. Accordingly, backups from the same client are then placed on the same data node to take advantage of the deduplication feature in the DDFS. However, data from different clients can also share common data. For example, files from the same version of the operating system or applications can be the same across different clients. In another naïve approach, when a new tag is created, DDFS associates the tag with one of the data nodes in a round robin fashion. Files are then placed to the data node according to the tag assignment. There is no guarantee that similar files are placed together. Therefore, the loss in the global storage efficiency can be significant.

In embodiments of the disclosure, a Global Deduplication Engine (GDE) including an analytic engine is utilized.

The Global Deduplication Engine (GDE) Architecture

Conventionally, the DDFS has been a monolithic application where all the features reside within the boundary of the DDFS, e.g., garbage collection (GC), load balancer (LB), replication (REPL), physical capacity reporting (PCR), etc. Each feature requires system resources—CPU, memory, and storage. DDFS systems are carefully sized to accommodate all the supported features. However, the analytic engine of the GDE requires a lot of memory as it has to scale to the amount of fingerprint information on the many nodes. It will also compete with other file system activities for the CPU resource. There are many obstacles to including the GDE in the conventional file system stack.

Accordingly, in one embodiment, the GDE runs in its own container—a local virtual machine (VM), a remote VM, or a micro service in the cloud. It is totally decoupled from the file system. There are many benefits associated with this approach. First, the GDE does not compete against the file system for resources. Second, the GDE container can be configured based on the requirements of the GDE itself, independent of the file system. Further, better analysis tools such as machine learning are available in the new programming environment.

Figure 3:
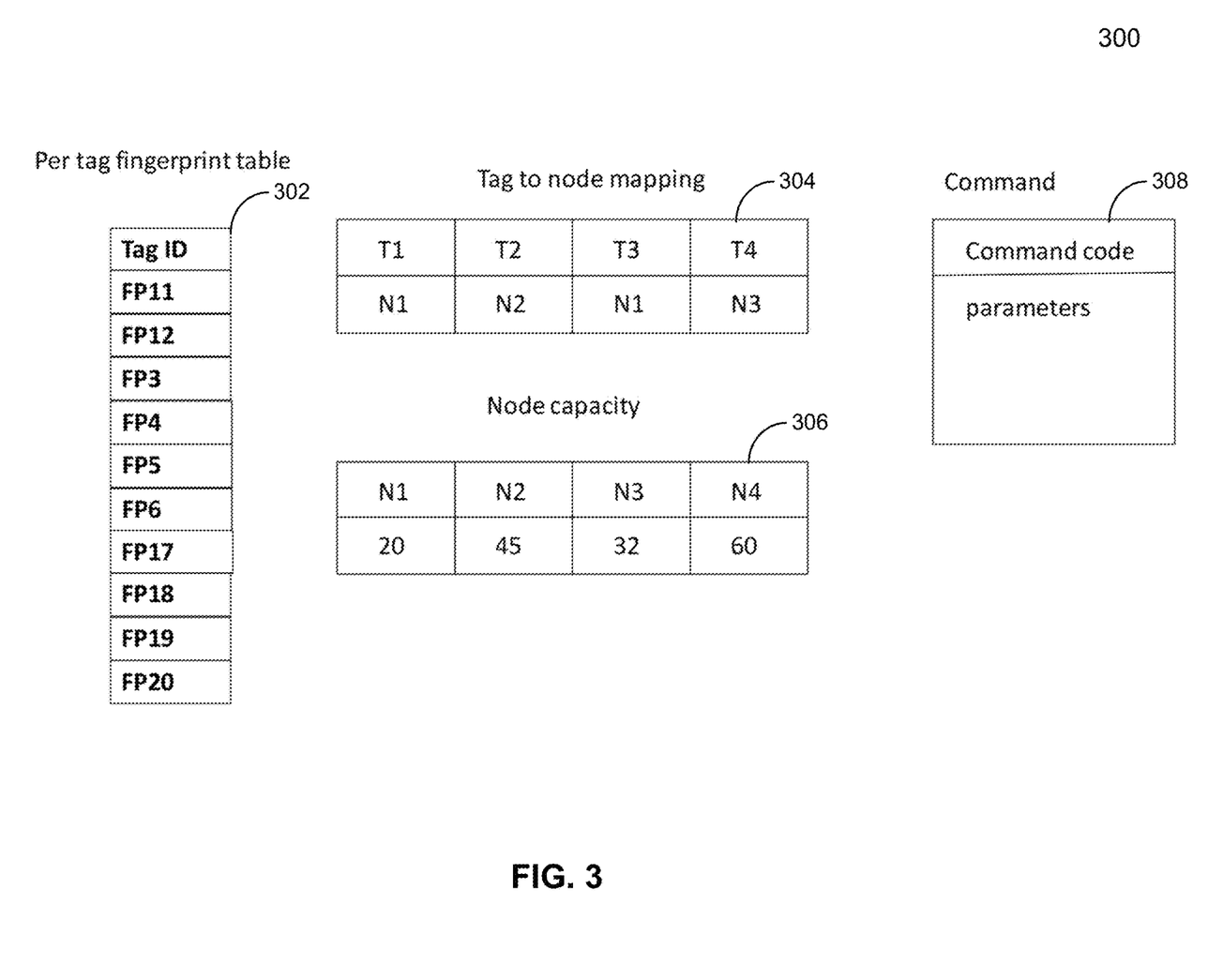
FIG. 3 is a diagram illustrating various example GDE data structures usable with embodiments of the disclosure.

Referring to FIG. 3, a diagram 300 illustrating various example GDE data structures usable with embodiments of the disclosure is shown. A per tag fingerprint table 302 comprise file segment fingerprints for the files stored in the storage system that are grouped by the associated tags. It should be appreciated that each file comprises one or more file segments, and each file segment is associated with a file segment fingerprint (e.g., a hash). Accordingly, a tag is also associated with all the file segment fingerprints of all the files associated with the tag. A tag to node mapping table 304 contains a mapping between the tags and the data nodes on which the files associated with the tags are stored. A node capacity table 306 comprises storage capacity limits of the data nodes. A command 308 comprises a command code and parameters. The command code indicates the operation to be performed.

In one embodiment, the DDFS communicates with the GDE via an asynchronous database protocol. Each data node writes the GDE data structures—per tag fingerprint table, tag to node mapping, tag sizing, node sizing, and command block to the database using a well-defined application programming interface (API). The GDE polls periodically for new commands, and triggers the analytic engine to generate the cluster information and global deduplication recipes as soon as all the required data is available.

In one embodiment, the GDE periodically writes its progress to the database. The DDFS nodes can choose between waiting for the result or checking back later. Once the GDE completes the analysis, it writes the cluster information and the global deduplication recipes to the database. The GDE further writes a command completion block to the database to signal the completion. The DDFS polls for the command completion record before the results from the GDE are utilized.

Therefore, the asynchronous protocol works well in the cluster environment when nodes can go down and come back online and transactions can get interrupted.

The Analytic Engine

Once the GDE receives all the required data, the analytic engine begins to process the data according to a predefined processing pipeline. In one embodiment, similarity between files associated with the tag T1 and files associated with the tag T2 is measured by the Jaccard index: $J(T1, T2)=|T1 \cap T2|/|T1 \cup T2|$ (i.e., the ratio between the intersection and the union). The dissimilarity is $1-J$. Known techniques may be utilized to determine similarity between file segments, files, or sets of files grouped by associated tags based on the file segment fingerprints. Accordingly, the Jaccard index can be computed directly from the per tag fingerprint table.

In one embodiment, an agglomerative hierarchical clustering algorithm is utilized. This unsupervised machine learning algorithm repeatedly combines the two most similar tags at each step until all the tags are in one big union.

Figure 4:
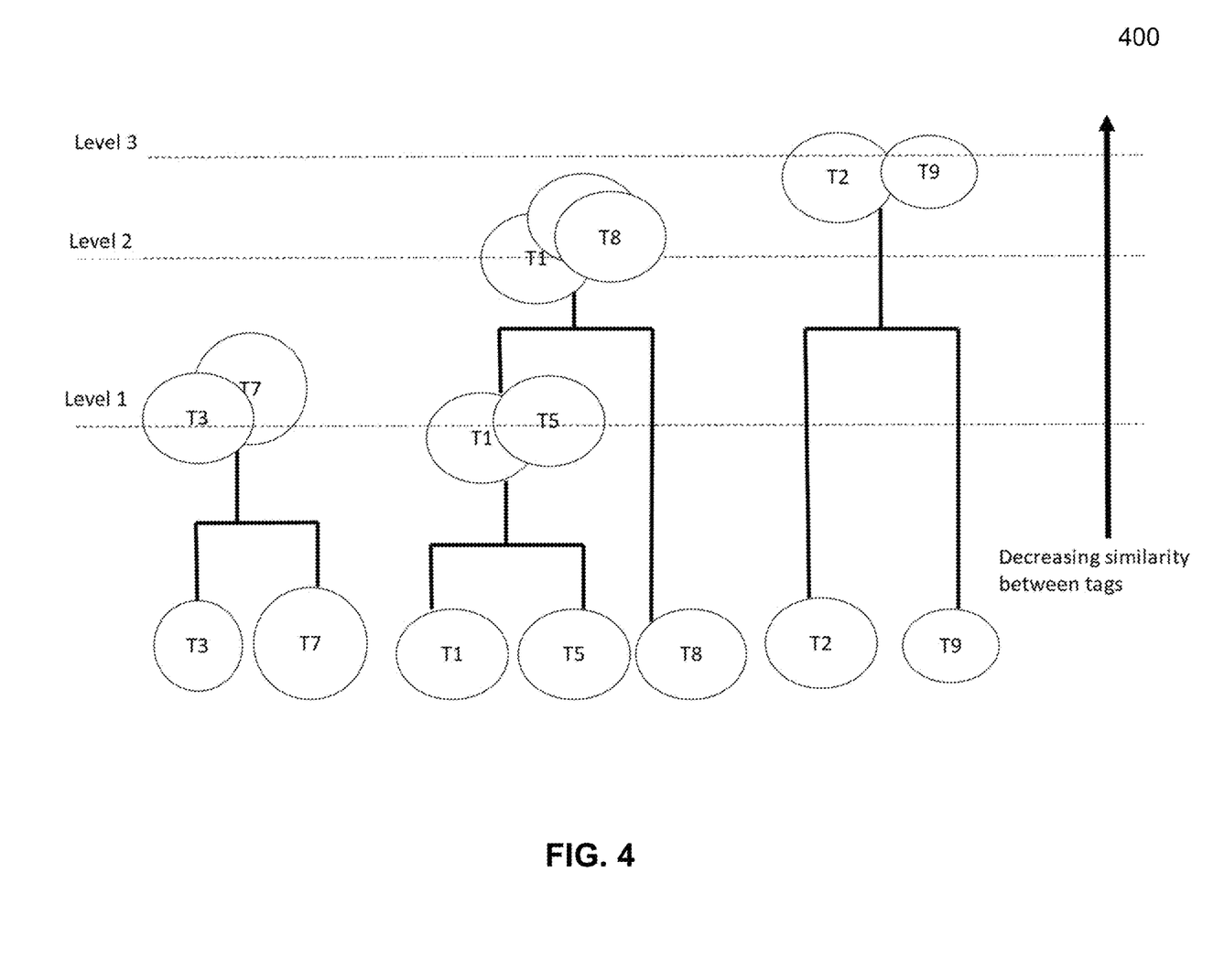
FIG. 4 is a diagram illustrating an example cluster hierarchy represented in a dendrogram.

Referring to FIG. 4, a diagram 400 illustrating an example cluster hierarchy represented in a dendrogram is shown. The dendrogram in FIG. 4 represents an example output of the agglomerative hierarchical clustering algorithm. The cluster information, which the dendrogram shows, is written to the database and the DDFS can use this result to report tag similarity statistics. It should be apparent that a tradeoff exists between the cluster size and the intra-cluster similarity. In different embodiments, for the purpose of global deduplication, clustering can be performed at either the tag level or the file level. In one embodiment, as shown in FIG. 4, clustering is performed at the tag level to reduce memory consumption. It should be appreciated that if clustering is performed at the tag level, files associated with the same tag are to be included or excluded as a whole in the file cluster candidates.

In one embodiment, clusters formed at a high dissimilarity (i.e., a low similarity) are discarded. The threshold dissimilarity above which the associated clusters are discarded can be configured. In one embodiment, the threshold dissimilarity may be 80%. All the other clusters and all their children clusters are considered in the placement algorithm, as will be described in further detail below. In one embodiment, it may be necessary to break a large cluster due to size constraints.

In one embodiment, an optimal placement algorithm is utilized to generate global deduplication recipes. Once the cluster dendrogram information is available, files in the same group should be placed together on the same node to maximize global deduplication. In one embodiment, not all the clusters in the hierarchy are considered for movement. The top level clusters can be quite dissimilar. For example, the entire union is one such cluster, and can be formed at a dissimilarity of 0.99. The size of such a cluster is likely too large and there is little benefit moving its members together. Therefore, clusters formed at a very high dissimilarity level are discarded. The threshold dissimilarity can be configurable.

There is one hard constraint in the placement algorithm. The GDE cannot move too much data to any single destination node such that it might cause the node to become very full. Accordingly, for each node, a limit may be set, e.g., on the DDFS side, on the maximum size of data that can be moved to that node in the command block. The GDE may operate within these limits. In one embodiment, a limit on the amount of data that can be moved out of the node can also be set for each node.

One naïve and non-optimal placement algorithm may pick a cluster at random and then pick a random destination for the cluster, as long as the size constraints are not violated.

In one embodiment, the deduplication ranking may be based on a tuple (space savings/movement, destination node). It should be noted that for each cluster, the space savings are the same irrespective of the destination, but the movement cost may be different depending on the destination. It should be appreciated that the least movement cost is incurred when a group is moved to where most of its members already reside.

Therefore, in one embodiment, the clusters are sorted based on the deduplication ranking. The clusters are selected in this order for movement unless a movement of a cluster would violate the node size constraints. Once a destination node becomes full, the node is removed from the destination list and the deduplication ranking is recomputed without the removed node.

Figure 5:
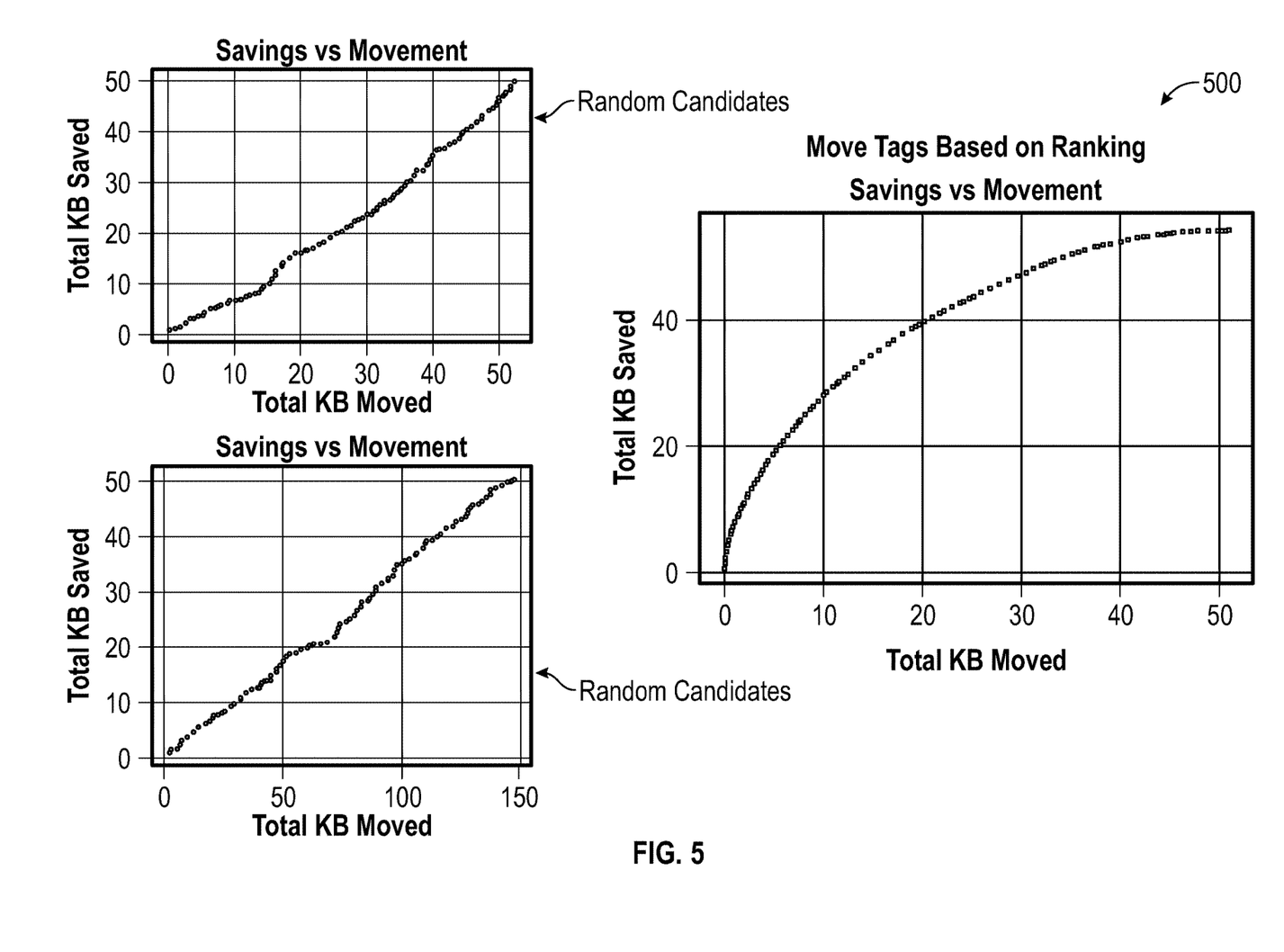
FIG. 5 is diagrams illustrating the deduplication space savings as a function of the amount of data moved.

Referring to FIG. 5, diagrams 500 illustrating the deduplication space savings as a function of the amount of data moved are shown. As can be seen in FIG. 5, when the recipes are not sorted, and are selected for execution at random, the marginal deduplication space savings (i.e., the slope of the plot) does not correlate with the total amount of data moved. It should be appreciated that if all the files are moved according to the recipes and there is no sizing violation, the order of file movement would not matter because the total movement would be the same regardless. However, in practice, only a small percentage of files are expected to be moved. This is due to a number of reasons. First, there are size constraints. Second, it takes a long time to move everything and the GDE movement can be aborted before completion due to a change in file topology. Third, the load balancer may request a node to migrate files to free up space as the node gets full. Fourth, the contents in the files may change. Further, the new global deduplication recipes may have been computed before all the movements are completed. Therefore, it is important to process the recipes that can generate the most cost-adjusted savings first. In other words, the optimal placement algorithm should gain the most with the least effort. FIG. 5 also shows that when the recipes that can generate the most cost-adjusted savings are executed first, more significant deduplication storage savings is achieved at the beginning of the file movements. It should be appreciated that if a lower level cluster (i.e., a child of some higher level cluster node is selected), all of its ascendants need to be removed as they are no longer valid. In other words, a lower ranked incompatible recipe needs to be removed.

Therefore, the optimal placement algorithm produces a list of recipes in the form [tag/file, source node, destination node, rank, savings, uniqueness %] ordered by the deduplication ranking. The recipes are written to the database. The data nodes may individually determine how the recipes are utilized—what to move, when to move, etc. In one embodiment, the DDFS may move the tags or files in the background at a low system priority to improve the overall operation of the system.

In one embodiment, global deduplication statistics may be reported. The statistics may include, for example, loss in deduplication cause by the local deduplication architecture in VSO, a global deduplication index (e.g., the physical size of the union of all tags/the current physical size of the tags on the cluster), and cross-tag deduplication information such as pairwise similarity, groups of similar tags, etc.

Figure 6:
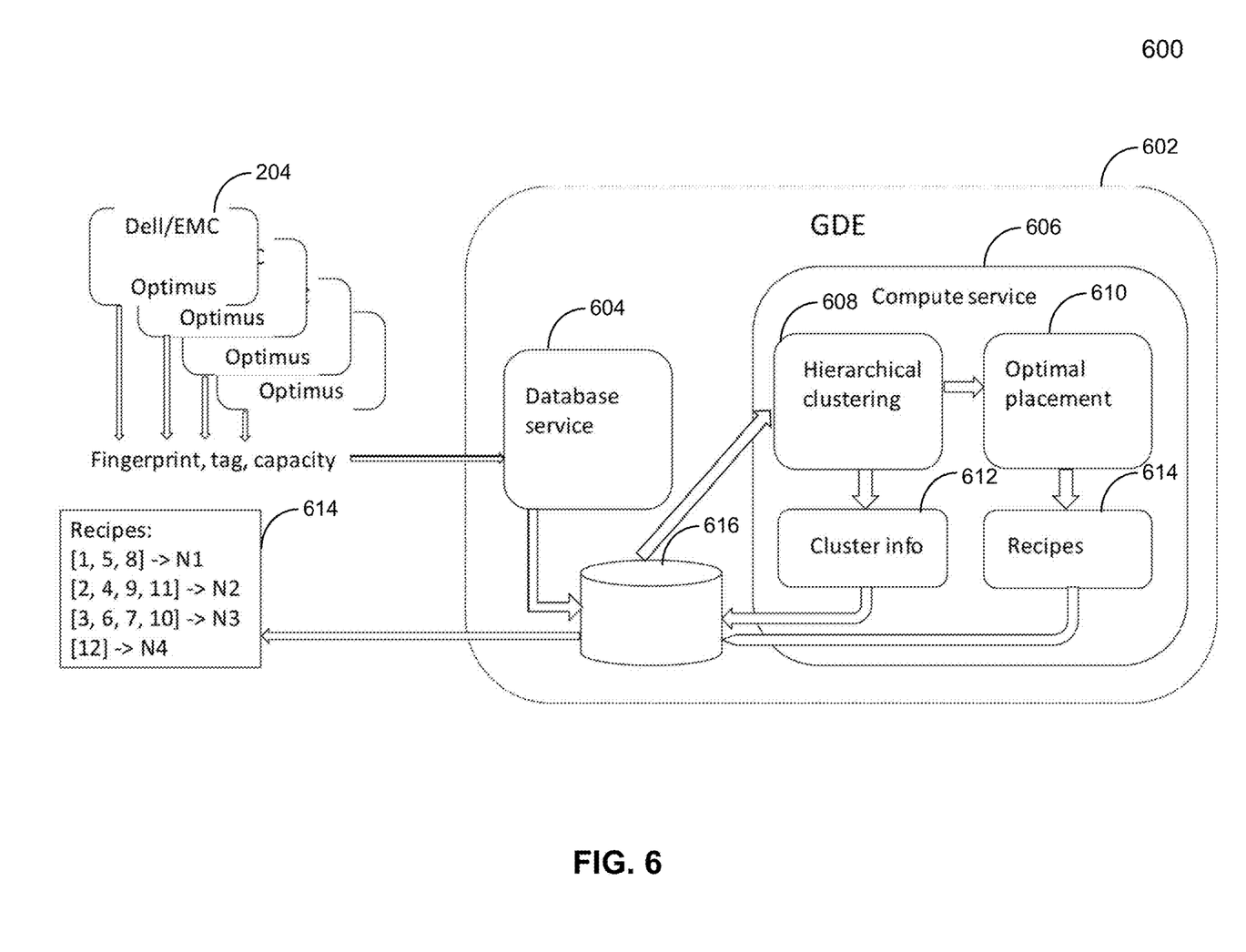
FIG. 6 is a block diagram illustrating various modules usable with embodiments of the disclosure.

Referring to FIG. 6, a block diagram 600 illustrating various modules usable with embodiments of the disclosure is shown. At the hierarchical clustering module 608 in a compute service module 606 of the GDE 602, a plurality of file cluster candidates are generated for a plurality of files stored at a multi-node storage system comprising a plurality of data nodes 204. Each of the plurality of file cluster candidates comprises some of the plurality of files. A similarity index is determined for each of the plurality of file cluster candidates based on similarity of the files comprised in the file cluster candidate. Cluster information 612 comprises information about the file cluster candidates. At the optimal placement module 610, a ranked recipe list comprising a plurality of recipes 614 is generated. Each recipe 614 is associated with one of the plurality of file cluster candidates, comprises a destination data node for the associated file cluster candidate, and is associated with a deduplication space savings determined based on a total file size and the similarity index of the associated file cluster candidate. The plurality of recipes 614 in the ranked recipe list are sorted based on data movement cost-adjusted deduplication space savings, with the recipe associated with a larger data movement cost-adjusted deduplication space savings being ranked higher. Thereafter, at least some of the plurality of files are moved between the plurality of data nodes 204 based on the recipes 614 in the ranked recipe list to improve deduplication space savings in the multi-node storage system. File movements based on highest ranked recipes in the ranked recipe list are performed first.

In one embodiment, the generating of the plurality of file cluster candidates, the determining of the similarity indexes, and the generating of the ranked recipe list are performed within a self-contained environment (e.g., a local VM, a remote VM, or a micro service in the cloud) separate from an operating system of the multi-mode storage system (e.g., the DDFS). In one embodiment, the ranked recipe list is stored at a shared database 616 managed by the database service module 604. The operating system of the multi-node storage system polls the shared database 616 to read the ranked recipe list prior to the moving of at least some of the plurality of files.

In one embodiment, each of the plurality of files is associated with a tag. The tag may be indicative of a source of the file. In one embodiment, each file cluster candidate comprises all files associated with one or more of the tags. In one embodiment, the similarity index comprises a Jaccard index.

In one embodiment, determining the data movement cost-adjusted deduplication space savings associated with a recipe comprises dividing the deduplication space savings associated with the recipe by a quantity of files that need to be moved.

In one embodiment, determining the data movement cost-adjusted deduplication space savings associated with a recipe comprises dividing the deduplication space savings associated with the recipe by an amount of data that need to be moved.

In one embodiment, a recipe in the ranked recipe list is ignored, invalidated, or removed when it is incompatible with a higher ranked recipe. Two recipes are incompatible with each other when the two file cluster candidates associated with the two recipes comprise at least one same file.

In one embodiment, each of the plurality of data nodes is associated with a storage size limit. A recipe in the ranked recipe list is ignored, invalidated, or removed when moving all files in the file cluster candidate associated with the recipe to the destination node of the recipe would cause a violation of the storage size limit of the destination node.

In one embodiment, one or more of the plurality of file cluster candidates whose similarity indexes are below a threshold are discarded, and are not included in the ranked recipe list.

Figure 7:
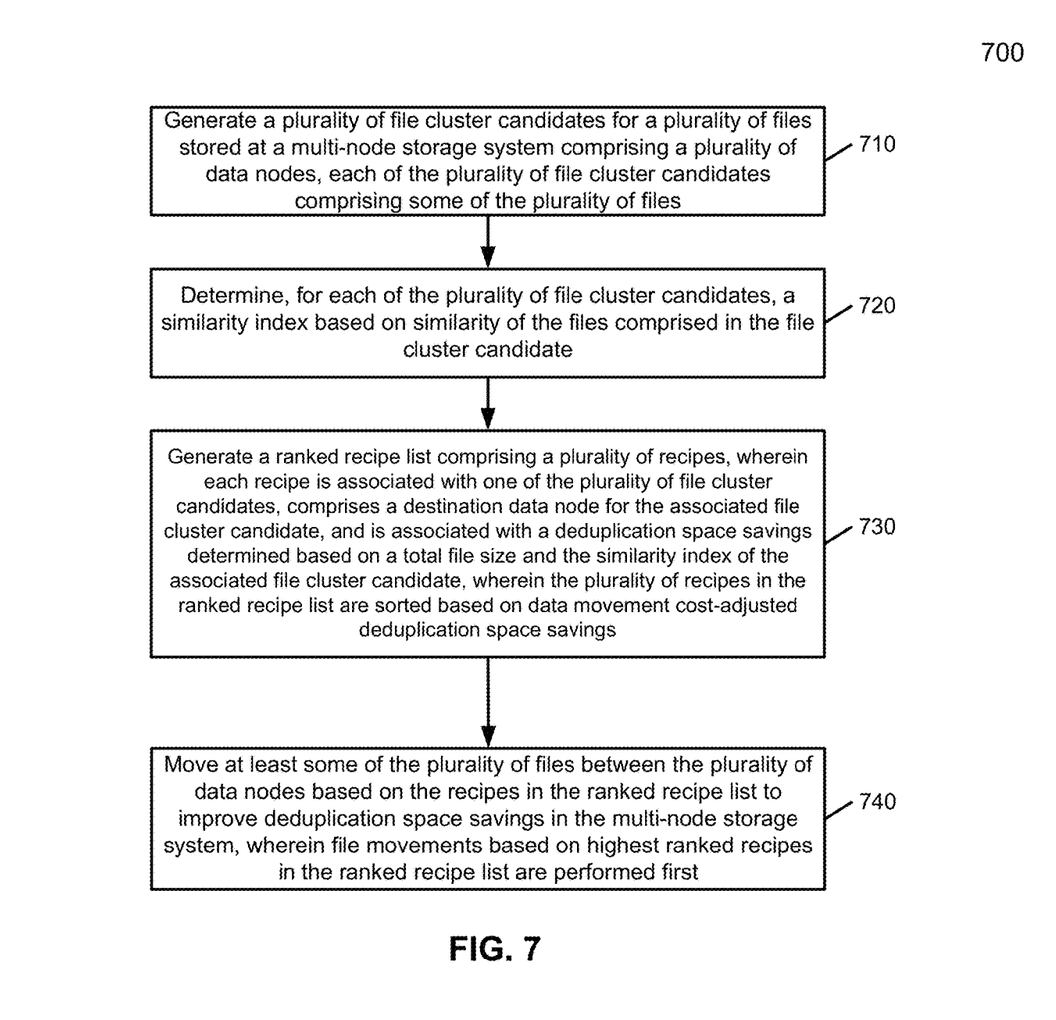
FIG. 7 is a flow diagram illustrating a process of redistributing files in a multi-node storage system to improve global deduplication storage savings according to one embodiment of the invention.

FIG. 7 is a flow diagram illustrating a process of redistributing files in a multi-node storage system to improve global deduplication storage savings according to one embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by processor 1501 of FIG. 8. Referring to FIG. 7, at block 710, a plurality of file cluster candidates are generated for a plurality of files stored at a multi-node storage system comprising a plurality of data nodes. Each of the plurality of file cluster candidates comprises some of the plurality of files. At block 720, a similarity index is determined for each of the plurality of file cluster candidates based on similarity of the files comprised in the file cluster candidate. At block 730, a ranked recipe list comprising a plurality of recipes is generated. Each recipe is associated with one of the plurality of file cluster candidates, comprises a destination data node for the associated file cluster candidate, and is associated with a deduplication space savings determined based on a total file size and the similarity index of the associated file cluster candidate. The plurality of recipes in the ranked recipe list are sorted based on data movement cost-adjusted deduplication space savings. At block 740, at least some of the plurality of files are moved between the plurality of data nodes based on the recipes in the ranked recipe list to improve deduplication space savings in the multi-node storage system. File movements based on highest ranked recipes in the ranked recipe list are performed first.

Note that some or all of the components as shown and described may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
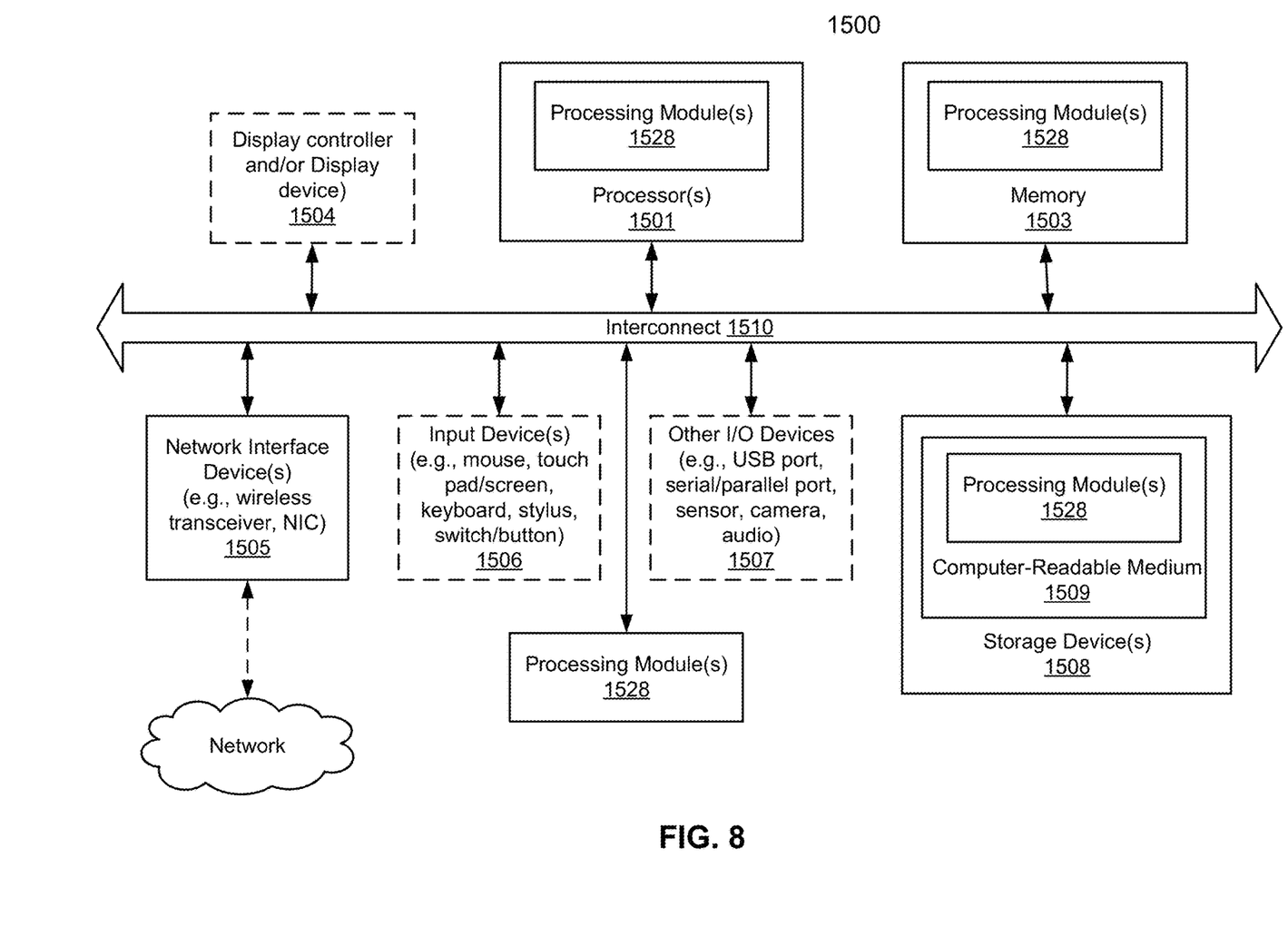
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, a global deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Therefore, embodiments of the disclosure relate to a method, apparatus, and system for moving data between the data nodes in a VSO architecture based on data similarity of the tags or files to improve global deduplication. It should be appreciated that a true inline global deduplication implementation requires a global fingerprint index. On data ingest, the file system may look up the global index to decide if the data segments already exist somewhere in the file system. Such a global index itself would be very complex—it must be distributed and fault tolerant. Furthermore, performance can be an issue. Even if such a global index can be implemented, garbage collection can be almost impossible. The conventional DDFS does not maintain any reference count of the data segments. To determine if a segment is live (i.e., being referenced) or dead, the metadata of the entire cluster—including all the nodes—must be enumerated. The memory requirement alone is prohibitive. There are also many other synchronization and performance issued. Therefore, the embodiments described herein represent a practical solution to the problem of global deduplication implementation.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
generating a plurality of file cluster candidates for a plurality of files stored at a multi-node storage system comprising a plurality of data nodes, each of the plurality of file cluster candidates comprising some of the plurality of files;
determining, for each of the plurality of file cluster candidates, a similarity index based on similarity of the files comprised in the file cluster candidate;
generating a ranked recipe list comprising a plurality of recipes, wherein each recipe is associated with one of the plurality of file cluster candidates, and each recipe comprises a destination data node for the associated file cluster candidate, and is associated with a deduplication space savings determined based on a total file size and the similarity index of the associated file cluster candidate, a tag to node mapping table comprising a mapping between a tag and each of the plurality of data nodes;
ranking the plurality of recipes in the ranked recipe list according to a data movement cost adjusted deduplication space savings associated with each recipe that is determined based on the deduplication space savings associated with a respective recipe and an amount of data or a quantity of files that is to be moved for the respective recipe, wherein a ranking of each recipe in the ranked recipe list increases with an increase in the deduplication space savings, or a decrease in the amount of data or the quantity of files; and the ranking of each recipe decreases with a decrease in the deduplication space savings, or an increase in the amount of data or the quantity of files; and
moving at least some of the plurality of files between the plurality of data nodes based on performing the recipes in the ranked recipe list according to the ranking, to improve deduplication space savings in the multi-node storage system, including determining an incompatibility between a first recipe in the ranked recipe list and a second recipe in the ranked recipe list, the incompatibility being determined in response to each of the first recipe and the second recipe being associated with a respective file cluster candidate that comprise at least one same file, and ignoring the first recipe in response to the second recipe being ranked higher than the first recipe in the ranked recipe list.

2. The method of claim 1, wherein each of the plurality of files is associated with the tag indicative of a source of the file, and wherein each file cluster candidate comprises all files associated with one or more tags.

3. The method of claim 1, wherein the similarity index comprises a Jaccard index.

4. The method of claim 1, wherein determining the data movement cost-adjusted deduplication space savings associated with each recipe comprises dividing the deduplication space savings associated with the recipe by the quantity of files that need to be moved.

5. The method of claim 1, wherein determining the data movement cost-adjusted deduplication space savings associated with each recipe comprises dividing the deduplication space savings associated with the recipe by the amount of data that need to be moved.

6. The method of claim 1, wherein the first recipe in the ranked recipe list is further invalidated or removed from the ranked recipe list in response to determining the incompatibility between the first recipe and the second recipe and in response to determining that the second recipe is ranked higher than the first recipe.

7. The method of claim 1, wherein each of the plurality of data nodes is associated with a storage size limit, and wherein a third recipe in the ranked recipe list is ignored, invalidated, or removed when moving all files in the file cluster candidate associated with the third recipe to the destination node of the third recipe would cause a violation of the storage size limit of the destination node.

8. The method of claim 1, wherein the generating of the plurality of file cluster candidates, the determining of the similarity indexes, and the generating of the ranked recipe list are performed within a self-contained environment separate from an operating system of the multi-mode storage system.

9. The method of claim 8, wherein the ranked recipe list is stored at a shared database, and wherein the operating system of the multi-node storage system polls the shared database to read the ranked recipe list prior to the moving of at least some of the plurality of files.

10. The method of claim 1, wherein one or more of the plurality of file cluster candidates whose similarity indexes are below a threshold are discarded, and are not included in the ranked recipe list.

11. A non-transitory machine-readable medium having instructions stored therein, which when executed by a processor, cause the processor to perform operations, the operations comprising:
generating a plurality of file cluster candidates for a plurality of files stored at a multi-node storage system comprising a plurality of data nodes, each of the plurality of file cluster candidates comprising some of the plurality of files;
determining, for each of the plurality of file cluster candidates, a similarity index based on similarity of the files comprised in the file cluster candidate;
generating a ranked recipe list comprising a plurality of recipes, wherein each recipe is associated with one of the plurality of file cluster candidates, and each recipe comprises a destination data node for the associated file cluster candidate, and is associated with a deduplication space savings determined based on a total file size and the similarity index of the associated file cluster candidate, a tag to node mapping table comprising a mapping between a tag and each of the plurality of data nodes;
ranking the plurality of recipes in the ranked recipe list according to a data movement cost adjusted deduplication space savings associated with each recipe that is determined based on the deduplication space savings associated with a respective recipe and an amount of data or a quantity of files that is to be moved for the respective recipe, wherein a ranking of each recipe in the ranked recipe list increases with an increase in the deduplication space savings, or a decrease in the amount of data or the quantity of files; and the ranking of each recipe decreases with a decrease in the deduplication space savings, or an increase in the amount of data or the quantity of files; and moving at least some of the plurality of files between the plurality of data nodes based on performing the recipes in the ranked recipe list according to the ranking, to improve deduplication space savings in the multi-node storage system, including determining an incompatibility between a first recipe in the ranked recipe list and a second recipe in the ranked recipe list, the incompatibility being determined in response to each of the first recipe and the second recipe being associated with a respective file cluster candidate that comprise at least one same file, and ignoring the first recipe in response to the second recipe being ranked higher than the first recipe in the ranked recipe list.

12. The non-transitory machine-readable medium of claim 11, wherein each of the plurality of files is associated with the tag indicative of a source of the file, and wherein each file cluster candidate comprises all files associated with one or more tags.

13. The non-transitory machine-readable medium of claim 11, wherein the similarity index comprises a Jaccard index.

14. The non-transitory machine-readable medium of claim 11, wherein determining the data movement cost-adjusted deduplication space savings associated with each recipe comprises dividing the deduplication space savings associated with the recipe by the quantity of files that need to be moved.

15. The non-transitory machine-readable medium of claim 11, wherein determining the data movement cost-adjusted deduplication space savings associated with each recipe comprises dividing the deduplication space savings associated with the recipe by the amount of data that need to be moved.

16. The non-transitory machine-readable medium of claim 11, wherein the first recipe in the ranked recipe list is further invalidated or removed from the ranked recipe list in response to determining the incompatibility between the first recipe and the second recipe and in response to determining that the second recipe is ranked higher than the first recipe.

17. The non-transitory machine-readable medium of claim 11, wherein each of the plurality of data nodes is associated with a storage size limit, and wherein a third recipe in the ranked recipe list is ignored, invalidated, or removed when moving all files in the file cluster candidate associated with the third recipe to the destination node of the third recipe would cause a violation of the storage size limit of the destination node.

18. The non-transitory machine-readable medium of claim 11, wherein the generating of the plurality of file cluster candidates, the determining of the similarity indexes, and the generating of the ranked recipe list are performed within a self-contained environment separate from an operating system of the multi-mode storage system.

19. The non-transitory machine-readable medium of claim 18, wherein the ranked recipe list is stored at a shared database, and wherein the operating system of the multi-node storage system polls the shared database to read the ranked recipe list prior to the moving of at least some of the plurality of files.

20. A data processing system, comprising:
a processor; and
a memory coupled to the processor to store instructions, which when executed by the processor, cause the processor to perform operations, the operations including generating a plurality of file cluster candidates for a plurality of files stored at a multi-node storage system comprising a plurality of data nodes, each of the plurality of file cluster candidates comprising some of the plurality of files;

determining, for each of the plurality of file cluster candidates, a similarity index based on similarity of the files comprised in the file cluster candidate;

generating a ranked recipe list comprising a plurality of recipes, wherein each recipe is associated with one of the plurality of file cluster candidates, and each recipe comprises a destination data node for the associated file cluster candidate, and is associated with a deduplication space savings determined based on a total file size and the similarity index of the associated file cluster candidate, a tag to node mapping table comprising a mapping between a tag and each of the plurality of data nodes;

ranking the plurality of recipes in the ranked recipe list according to a data movement cost adjusted deduplication space savings associated with each recipe that is determined based on the deduplication space savings associated with a respective recipe and an amount of data or a quantity of files that is to be moved for the respective recipe, wherein a ranking of each recipe in the ranked recipe list increases with an increase in the deduplication space savings, or a decrease in the amount of data or the quantity of files; and the ranking of each recipe decreases with a decrease in the deduplication space savings, or an increase in the amount of data or the quantity of files; and moving at least some of the plurality of files between the plurality of data nodes based on performing the recipes in the ranked recipe list according to the ranking, to improve deduplication space savings in the multi-node storage system, including determining an incompatibility between a first recipe in the ranked recipe list and a second recipe in the ranked recipe list, the incompatibility being determined in response to each of the first recipe and the second recipe being associated with a respective file cluster candidate that comprise at least one same file, and ignoring the first recipe in response to the second recipe being ranked higher than the first recipe in the ranked recipe list.

* * * * *